(12) United States Patent
Kalhan (10) Patent No.: US 9,554,408 B2
(45) Date of Patent: Jan. 24, 2017

(54) DEVICE DISCOVERY MANAGEMENT USING PEER DEVICE RELATIONSHIPS FOR DEVICE-TO-DEVICE (D2D) COMMUNICATION

(71) Applicant: Kyocera Corporation, Kyoto (JP)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 61 days.

(21) Appl. No.: 14/399,461

(22) PCT Filed: May 10, 2013

(86) PCT No.: PCT/US2013/040593
§ 371 (c)(1),
(2) Date: Nov. 6, 2014

(87) PCT Pub. No.: WO2013/170181
PCT Pub. Date: Nov. 14, 2013

(65) Prior Publication Data
US 2015/0163842 A1  Jun. 11, 2015

Related U.S. Application Data

(60) Provisional application No. 61/645,946, filed on May 11, 2012.

(51) Int. Cl.
*H04B 7/00* (2006.01)
*H04W 76/02* (2009.01)
(Continued)

(52) U.S. Cl.
CPC .......... *H04W 76/023* (2013.01); *H04W 8/005* (2013.01); *H04W 84/18* (2013.01); *H04W 8/186* (2013.01); *H04W 48/12* (2013.01)

(58) Field of Classification Search
CPC .... H04W 76/023; H04W 8/005; H04W 8/186; H04W 48/12; H04W 84/18
(Continued)

(56) References Cited

U.S. PATENT DOCUMENTS 8,493,887 B2 * 7/2013 Palanki ................ H04W 8/005
370/254
2004/0248569 A1  12/2004 Kondou et al.
(Continued)

FOREIGN PATENT DOCUMENTS

JP  2004-312331  11/2004
JP  2005-223722  8/2005
(Continued)

OTHER PUBLICATIONS

Fodor et al.; "Design Aspects of Network Assisted Device-to-Device Communications"; IEEE Communications Magazine, Mar. 2012; IEEE Service Center; Piscataway, US.
(Continued)

*Primary Examiner* — Dominic Rego (57) ABSTRACT

In a macrocell wireless communication system that supports device-to-device (D2D) communication, wireless communication devices 104, 106 identified as peer devices are monitored for an occurrence of a trigger event 122 related to the quality of the D2D radio path between the peer devices. In response to the trigger event, information 118, 120 is sent to at least one peer device to invoke a search for the other peer device. Wireless communication devices may be identified as peer devices based on, for example, call history and contents of a contacts list of at least one of the wireless communication devices. The quality of the D2D radio path 114 may be based on, or at least estimated using, the geographical positions of the wireless communication devices.

18 Claims, 5 Drawing Sheets

(51) Int. Cl.
*H04W 8/00* (2009.01)
*H04W 84/18* (2009.01)
*H04W 8/18* (2009.01)
*H04W 48/12* (2009.01)

(58) Field of Classification Search
USPC ................ 455/41.1–41.3, 418, 420, 500
See application file for complete search history.

(56) References Cited

U.S. PATENT DOCUMENTS

| | | | |
|---|---|---|---|
| 2004/0259543 A1* | 12/2004 | Lee | ................ H04W 4/16 455/433 |
| 2010/0227610 A1 | 9/2010 | Jabara et al. | |
| 2011/0275382 A1 | 11/2011 | Hakola et al. | |

FOREIGN PATENT DOCUMENTS

| | | |
|---|---|---|
| WO | WO 03/049326 A1 | 6/2003 |
| WO | WO 2011/130630 A1 | 10/2011 |

OTHER PUBLICATIONS

INTEL; "Operator Managed and Operator Assisted D2D"; 3GPP Draft: S1-120063 Managed or Assisted D2D; Feb. 6, 2012; 3GPP Mobile Competence Center, France.
3GPP; "3rd Generation Partnership Project; Technical Specification Group SA; Feasibility Study for Proximity Services"; 3GPP Draft: S1-120349; Apr. 19, 2012; 3GPP, France.

\* cited by examiner

DEVICE DISCOVERY MANAGEMENT USING PEER DEVICE RELATIONSHIPS FOR DEVICE-TO-DEVICE (D2D) COMMUNICATION

FIELD

This invention generally relates to wireless communications and more particularly to using peer device relationships to manage device discovery for device-to-device (D2D) communication resources.

BACKGROUND

Many wireless communication systems use base stations to provide geographical service areas where wireless communication user equipment (UE) devices communicate with the base station providing the particular geographical service area. The base stations are connected within a network allowing communication links to be made between the wireless communication devices and other devices. In some circumstances, the communication links are between wireless communication UE devices that are close to each other. In these situations, it may be preferred to have a direct communication link between the two wireless UE devices rather than communicating through a base station. Such direct communication between devices is often referred to as device-to-device (D2D) communication or peer-to-peer (P2P) communication.

SUMMARY

In a macrocell wireless communication system that supports device-to-device (D2D) communication, wireless communication devices identified as peer devices are monitored for an occurrence of a trigger event related to the quality of the D2D radio path between the peer devices. In response to the trigger event. information is sent to at least one peer device to invoke a search for the other peer device. Wireless communication devices may be identified as peer devices based on, for example, call history and contents of a contacts list of at least one of the wireless communication devices. The quality of the D2D radio path may be based on, or at least estimated using, the geographical positions of the wireless communication devices. In one example, the wireless communication devices are instructed to transmit reference signals using assigned D2D communication resources. When the wireless communication devices are within communication range, one of wireless communication device detects the reference signal of the other peer wireless communication device. The detection is reported to the core network thorough the base station. If appropriate, the base station, in collaboration with the core network, sends D2D link establishment messages to the wireless communication devices to establish a D2D communication link between the peer devices.

DETAILED DESCRIPTION

Figure 1:
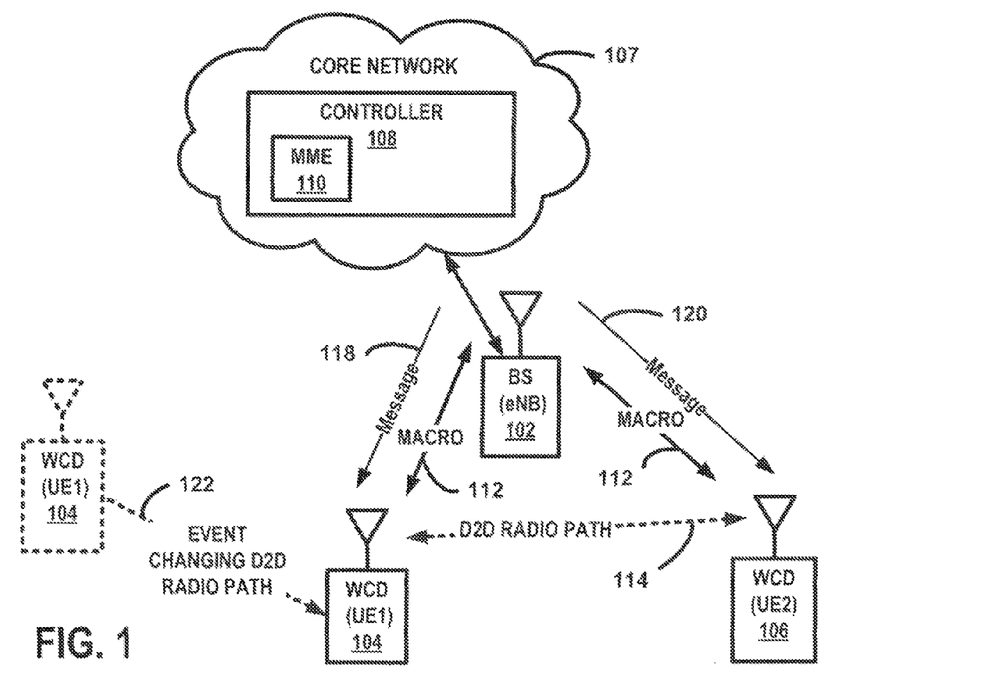
FIG. 1 is block diagram of a wireless communication system where wireless communication devices are able to engage in device to device (D2D) communication.

For the examples below, the core network manages and organizes peer device relationships using peer lists. A peer list is maintained for each wireless communication device where each peer list includes a unique identifier for each wireless communication device considered to be a peer device of the wireless communication device to which the peer list pertains. Based on the peer list and relative geographical positions of wireless communication devices, two wireless communication devices are identified as device-to-device (D2D) communication candidates. If the wireless communication devices are not already transmitting reference signals, at least one of the wireless communication devices is instructed to transmit reference signals using assigned D2D communication resources. The other peer device is provided the reference signal information including the communication resources (time and frequency resources) of the D2D reference signals transmitted by the other peer device. When the wireless communication devices are within communication range, each wireless communication device detects the reference signal of the other wireless communication device. The detection is reported to the network. If appropriate, the network transmits D2D link instructions to facilitate establishment of a D2D communication link between the devices. FIG. 1 is block diagram of a wireless communication system 100 where wireless communication devices are able to engage in device to device (D2D) communication. A base station 102 provides wireless communication services to wireless communication user equipment (UE) devices 104, 106 within a geographical service area, sometimes referred to as a cell. Several base stations are typically interconnected through a backhaul to provide several service areas to cover large areas. The various functions and operations of the blocks described with reference to the communication system 100 may be implemented in any number of devices, circuits, or elements. Two or more of the functional blocks may be integrated in a single device and the functions described as performed in any single device may be implemented over several devices. For example, at least some of the functions of the controller 108 may be performed by the base station 102 and vice versa. A cellular communication system is typically required to adhere to a communication standard or specification. The Third-Generation Partnership Project Long-Term Evolution (3GPP LTE) communication specification is a specification for systems where base stations (eNodeBs) provide service to wireless communication devices (user equipment (UE) devices) using orthogonal frequency-division multiplexing (OFDM) on the downlink and single-carrier frequency-division multiple access (SC-FDMA) on the uplink. Although the techniques described herein may be applied in other types of communication systems, the exemplary systems discussed herein operate in accordance with a 3GPP LTE communication specification.

The base station 102 is a fixed transceiver station, also referred to as an eNodeB or eNB, which may include a controller in some circumstances. The base station 102 is connected to a core network 107 which includes infrastructure and backhaul for managing and routing communications from the wireless communication devices through the network. The base station 102 is connected to a controller 108 through backhaul which may include any combination of wired, optical, and/or wireless communication channels. For the examples herein, the controller 108 includes the functionality of the Mobility Management Entity (MME) 110 and the Packet Gateway (P-GW) in a 3GPP LTE communication system. Accordingly, the controller 108 includes a scheduler. In the example, the scheduler allocates time-frequency resources for D2D communication between the wireless communication devices 104, 106 and for macrocell communication between the base station 102 and the wireless communication devices 104, 106.

The wireless (UE) communication devices 104, 106 may be referred to as mobile devices, wireless devices, wireless communication devices, and mobile wireless devices, UEs, UE devices as well as by other terms. The wireless communication devices (UEs) 104, 106 include electronics and code for communicating with base stations and with other wireless communication devices in D2D configurations. The wireless communication devices include devices such as cell phones, personal digital assistants (PDAs), wireless modem cards, wireless modems, televisions with wireless communication electronics, and laptop and desktop computers as well as other devices. The combination of wireless communication electronics with an electronic device, therefore, may form a wireless communication device 104. For example, a wireless communication device may include a wireless modem connected to an appliance, computer, or television.

The base station 102 includes a wireless transceiver that exchanges macrocell wireless signals with the wireless communication devices 104, 106 over macrocell radio links 112. Transmissions from the base stations and from the wireless communication devices 104, 106 are governed by a communication specification that defines signaling, protocols, and parameters of the transmission. The communication specification may provide strict rules for communication and may also provide general requirements where specific implementations may vary while still adhering to the communication specification. Although the discussion below is directed to the 3GPP Long Term Evolution (LTE) communication specification, other communication specifications may be used in some circumstances. The communication specification defines at least a data channel and a control channel for each of uplink and downlink transmissions and specifies at least some timing and frequency parameters for physical downlink control channels from a base station to a wireless communication device.

The macrocell communication resources are used for transmitting the downlink signals and the uplink signals. The base station 102 transmits downlink signals to the wireless communication devices 104, 106 using scheduled downlink communication resources of the defined downlink communication resources defined by the communication specification and reserved for downlink communication. The wireless communication devices transmit uplink signals to the base station using scheduled uplink communication resources of the defined uplink communication resources defined by the communication specification and reserved for uplink communication. The macrocell communication resources include frequency bands divided in time where each frequency band and segment of time can be identified by the scheduler and described in control signals sent from the base station 102 to the wireless communication devices 104, 106. The communication specifications, or other system rules, therefore, define applicable communication resources for the downlink and applicable communication resources for the uplink. The scheduler allocates different time-frequency resources to different devices to efficiently utilize the resources while minimizing interference. Accordingly, the scheduled macrocell communication resources used for signals exchanged with one wireless communication device 104 are different from scheduled macrocell communication resources used for other signals exchanged with other wireless communication devices 106. As referred to herein, therefore, the macrocell communication resources are the communication resources reserved for communication by the specification and/or communication system rules. The scheduled resources for transmission for particular signals, however, are a subset of the reserved macrocell communication resources.

Some of the defined macrocell communication resources are assigned (scheduled) for D2D communication. This portion of defined macrocell communication resources, referred to as D2D communication resources, is typically scheduled dynamically as needed and based on channel conditions as well as other criteria. The scheduler, therefore, may assign either defined macrocell downlink communication resources, defined macrocell uplink communication resources, or both for D2D communication in the examples herein.

In certain situations, it may be desirable for the wireless communication device to communicate directly over a D2D communication link instead of through base stations. During D2D communication, the first wireless communication device 104 transmits D2D signals to the second wireless communication device 106 and the second wireless communication device 106 transmits D2D signals to the first wireless communication device 104. In some situations, the D2D transmission may only be in one direction. For example, a D2D link may be established from a laptop to a display where only the laptop transmits signals to the display. Examples of suitable techniques for managing downlink resources for D2D communication are discussed in Patent Application Serial Number PCT/US2012/064711, entitled "DEVICE TO DEVICE COMMUNICATION MANAGEMENT USING MACROCELL COMMUNICATION RESOURCES," filed on Nov. 12, 2012, and incorporated by reference in its entirety herein.

For efficient D2D communications, the wireless communication devices typically must be close to each other such that the D2D radio path 114 has a sufficient quality to sustain wireless communication between the two devices. Since many wireless communication devices are mobile, the distances between any two devices changes. As a result, either the network or one of the wireless communication devices must determine that the wireless communication devices are sufficiently close for D2D communication. In the examples herein, a wireless communication device detects another nearby wireless communication device by receiving a reference signal transmitted by the other wireless communication device. After detection, the wireless communication device may attempt to initiate a D2D communication link. The reference signal of each wireless communication device is unique to every other reference signal transmitted by other wireless communication devices at least for wireless communication devices in the same area. A suitable technique for maintaining unique reference signals includes embedding the unique device identifier (ID) within the reference signal.

In the examples, the core network monitors peer communication devices and notifies at least one of the devices when a peer device is likely within D2D radio communication range. The devices can then search for the reference signals. Such a scheme increases efficiency and reduces power consumption since the devices only search for a peer device when it is nearby.

The scheduler allocates time-frequency resources for communication between the base station 102 and the wireless communication devices 104, 106. In addition, the controller 108, scheduler, and/or the base station 102 schedules sounding reference signals (SRS) on the uplink. In the examples discussed herein, the scheduler also allocates (schedules) time-frequency resources for transmission of D2D reference signals such as D2D SRS from the wireless communication UE devices 104, 106 to establish and/or maintain the device-to-device (D2D) communication link. The D2D SRS transmissions are used for device detection/discovery, signal acquisition (reception), channel estimation, and determining CSI. An example of such techniques are described in PCT patent application serial number PCT/US2012/64712, filed on Nov. 12, 2012, and incorporated by reference in its entirety herein. In the examples herein, therefore, wireless communication devices detect/discover other wireless communication devices in their vicinity by transmitting and receiving D2D SRS signals.

The D2D reference signals are periodically transmitted by all wireless communication devices having the capability of communicating over a D2D link. Each device is assigned communication resources for transmitting the D2D reference signals. New communication resources are typically assigned to a wireless communication device when the device transitions to a new service area. For example, after a handoff (handover) is complete, new D2D reference signal resources are assigned to the wireless communication device that has been handed off. In some situations, the wireless communication devices may be instructed not to transmit D2D reference signals. In other circumstances, the wireless communication device only transmitted D2D reference signals when instructed to do so and does not periodically transmit reference signals as is done for the examples discussed herein.

The wireless communication devices are able to communicate through a D2D communication link when the D2D radio path 114 between them meets certain criteria. The quality of the D2D radio path 114 must be above a minimum threshold for a D2D communication. The D2D radio path 114 is affected by several factors such as propagation loss, fading, distance between the devices, and interference. The quality of the D2D radio 114 generally improves as the distance between the devices is reduced. In some situations, the quality may improve with a change in the geographical position of one or both of the devices even though the relative distance between the devices has not changed. For example, if a device moves from within a building to the exterior of building without moving closer to another device, the D2D radio path 114 quality may improve even though the relative distance has not changed. In the examples herein, certain events 122 that may sufficiently improve the quality of the D2D radio path trigger the transmission of messages 118, 120 from the base station to wireless communication devices where the messages 118, 120 at least invoke a search for a wireless communication device. Some examples of trigger events include a change in geographical position of one or both of the devices that reduced the distance between the devices, a change in geographical position of one or both of the devices that reduces the affects of radio path obstructions, and reduction in interference caused by other devices.

Various techniques may be used to transfer and maintain information related to the devices, peer device relationships, D2D reference signals, assignment of resources for reference signal and D2D communication, peer device searching, and other parameters. For the examples herein, the management of the information is represented by peer lists and search lists. The core network 107 maintains a peer list and the wireless communication devices maintain search lists where the peer lists include a list of peer devices for each device and the search lists include a list of peer devices that should be searched by the device.

Figure 2:
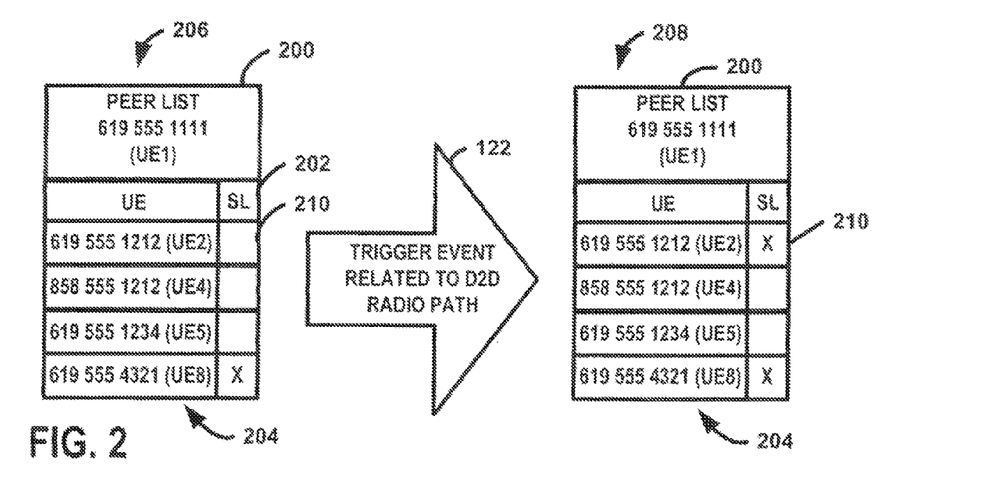
FIG. 2 is an illustration of a representation of a change in a peer list.

FIG. 2 is an illustration of a representation of a change in a peer list 200 for a first wireless communication device 104 (UE1). Peer devices are wireless communication devices that are associated with each other based on information where the information may include call history and/or contacts list contents of one or both of the devices. The core network 107 maintains a peer list 200 for each device where the peer list 200 identifies one or more other devices that meet the criteria of a peer device. In addition, the core network 107 maintains a search list record 202 for each peer device in each peer list, where the search list record 202 indicates whether the wireless communication device has been instructed to search for the peer device corresponding to the search list record. When an event occurs that is likely to improve the D2D link between a device and a peer device in its list, the devices are instructed to search for the other peer device. Accordingly, the search list record 202 is updated to indicate that the wireless communication device has been notified of the change in quality of the D2D radio path 114.

The peer list 200 is represented in FIG. 2 as a table where each peer device is identified in the table by a unique identifier 204 such as telephone number. The table also includes a search list indicator 202 associated with each peer device identifier 204 where the search list indicator 202 indicates whether the device has been instructed to search for the particular associated peer device. The tables shown in the figures provide a technique for representing information and relationships related to the peer list. The information and relationships, however, can be maintained within the core network 107 using any of many known techniques.

In response to detecting a trigger event 122 that may sufficiently improve the D2D radio path 114 between two peer devices, the core network 107 instructs one or both of the peer devices to search for the other device. For the discussion herein, the instruction to search is represented as an update message to a peer search list maintained by each device.

Examples of events that may change the D2D radio link may be a change in geographical position of one or both of the devices, a change in the serving base station for one or both of the devices, a recent base station registration by one of the devices or a combination of events. In general, the triggering event 122 can be any event that may increase a likelihood that the peer devices will be able to communicate through a D2D communication link.

For the example in FIG. 2, detection of a trigger event 122 related to the D2D radio path results in a change in the peer list 200 for a first device (UE1). The peer list 200 is illustrated as peer list 206 before the trigger event 122 and as peer list 208 after the trigger event 122. As mentioned above, the trigger event 122 may be any event or combination of events that sufficiently increase the chances of communication over the D2D radio path 114. For example, the core network 107 may determine that a change in geographic position of the first device has placed the two peer devices within a radio communication range. In some situations, the geographic positions of the devices may be known by the network through triangulation, GPS, current serving base station, or other techniques. In other situations, however, the network 107 may determine a general area within which each wireless communication device is located. Such a situation occurs where a device is registered to a base station and a peer device enters the coverage area of the base station. The core network 107 determines that, since the two devices are in the same base station service area, the likelihood that they can communicate over a D2D communication link has increased. In other situations, combinations of techniques for monitoring parameters or a combination of events can be used to trigger a change to a peer list.

For the example of FIG. 2, the core network 107 determines that a trigger event 122 has changed the D2D radio path between the first wireless communication device (UE1) and a second wireless communication device (UE2). The core network sends messages to 118, 122 to a first wireless communication device (UE1) and a second wireless communication device (UE2) through the base station 102. The value of the search list record 210 for the second device (UE2) in the peer list 200 of the first device (UE1) is changed to reflect that the two devices (UE1 and UE2) may be close enough for D2D communication. In the examples herein, the devices do not simultaneously search for the other peer device but rather alternate in searching. The time periods for searching may be provided to each peer device by the core network allowing the devices to autonomously search and discontinue searching such that only one device is searching at any given time. Alternatively, the network may instruct one device to search without informing the other device. After a time period, the core network can then send messages to terminate the searching by the one device and initiate searching by the other device. In such situations, no message is sent to the other device. In some circumstances, however, searching may be performed by only one device where the core network instructs one device to search without notifying the other device.

Figure 3:
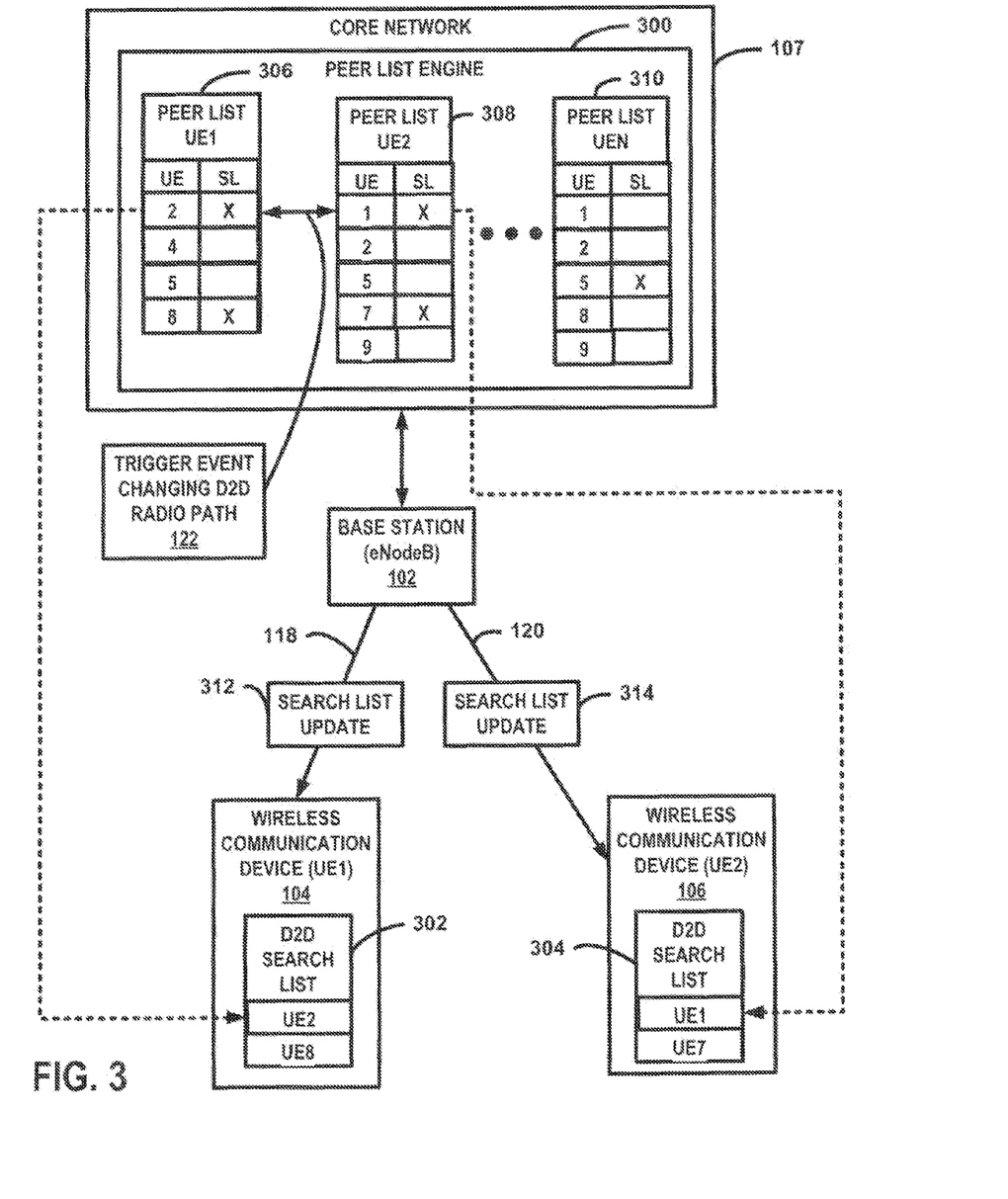
FIG. 3 is a block diagram of an example of the system where the core network includes a peer list engine and the wireless communication devices include D2D search lists.

FIG. 3 is a block diagram of an example of the system 100 where the core network 107 includes a peer list engine 300 and the wireless communication devices 104, 106 include D2D search lists 302, 304. The peer list engine 300 is any combination of hardware, software, and/or firmware that performs the functions discussed herein. The peer list engine 300 may be an application running on a single device within the core network 107 or may be distributed over several pieces of equipment or infrastructure. For example, the peer list engine 300 may be a program running on a server connected to the controller 108 operating within the core network 107.

The peer list engine 300 maintains a peer list for each wireless communication device operating within the system. FIG. 3 shows an N number of peer lists including first peer list 306 for a first device, a second peer list 308 for a second device, and a peer list 310 for an nth device. The peer list engine 300, therefore, can maintain any number of peer lists where each peer list corresponds to a wireless communication device.

In the interest of brevity and clarity, the peer lists 306, 308, 310 are shown with single digit identifiers in FIG. 3. As discussed above, however, each device is identified by a unique ID such a phone number in the examples. The peer lists may be updated in at least two ways for the example. The peer devices listed in a peer list may be added or deleted. Also, the search list status of the listed peer devices may be changed. For the examples herein, the inclusion of a peer device in a peer list depends on a call history and a contacts list for the device. Changes to peer lists resulting in the addition or deletion of a peer device are discussed in further detail below with reference to FIGS. 4, 5, 6, and 7.

The peer list engine 300 monitors information available to the core network 107 and evaluates the information in light of the peer lists 306, 308, 310 to determine if a trigger event 122 has occurred that requires a change in the search list of any device. The search list record 202 is updated for the peer devices in each peer list where a trigger event warrants a change. A search list update message 118, 120 is sent to the wireless communication devices instructing the wireless communication devices to update their respect search lists. The message 118, 120 provides information that allows the wireless communication device to search for the peer device. For example, the message 118, 120 may provide the communication resources, such as frequency-time resources, being used by the peer device to transmit reference signals. The message may also include a time periods to search and device identification information. The notification to search a peer device can be represented as a search list update message 312, 314 that updates the search list 302, 304 maintained in the wireless communication device. Each search list 302, 304 includes identifiers of peer devices of the wireless communication device that the peer list engine 300 has determined may be in D2D communication range of the wireless communication device. In situations where the wireless communication devices are not periodically transmitting D2D reference signals, the D2D reference signal communication resources may need to be assigned before the other peer device is provided the information needed to receive the reference signal. An example of a suitable technique for transmitting the search update message includes sending update information over the Physical Downlink Shared Channel (PDSCH) as data traffic. The upper layers in the application process the PDSCH messages and update the search list. For the examples herein, the update information includes at least the unique identifier of the peer device that is the subject of the update. In addition, the update information includes information that allows the wireless communication device to receive the reference signals of the wireless communication device that is subject of the update if the information is not already available at the wireless communication device. Such information includes demodulation and decoding information to allow the wireless communication device to receive the reference signals from the peer device and may include scrambling codes, timing delay, and triggering event information.

For the example, each peer device is also provided a search time period in addition to the search list update to allow the two devices to alternate searching. Although less efficient, other techniques may include allowing both devices to search simultaneously. In other situations, the search list update message may be sent only to one device. Further, the search list update messages may be sent at different times to the two devices.

The peer list may be updated based on incoming call history or outgoing call history. For example, if the first device is called by the second device, the peer list for the first device may be changed to include the second device as a peer device and/or the peer list for the second device may be updated to include the first device as a peer device.

Figure 4:
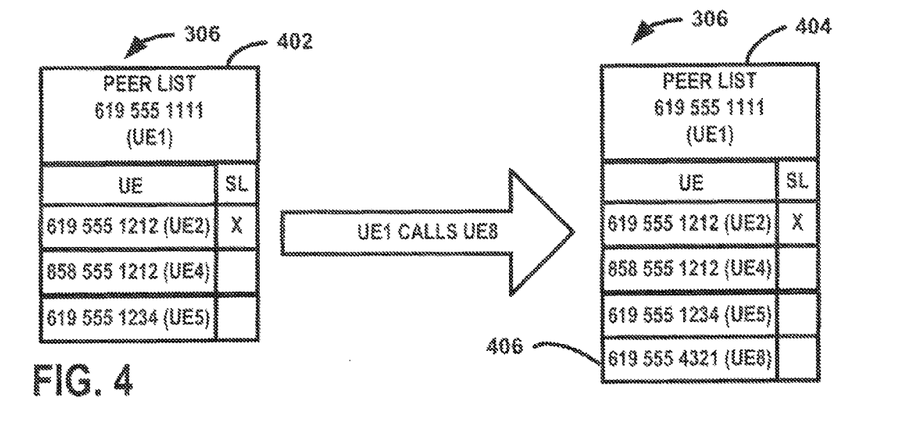
FIG. 4 is an illustration of an example of change of a peer list due to a call history where the device associated with the peer list places a call.

FIG. 4 is an illustration of an example of change of a peer list 306 due to a call history where the device 104 associated with the peer list 306 places a call. The peer list 306 is shown as a peer list 402 before the call and as peer list 404 after the call. Call history may be maintained by any applications or devices within the system 100. For example, call history can be maintained by the billing process within the system. When the first device 104 places a call to the other device (UE8 for the example), the call history is updated. The peer list engine 300 is communicatively connected to the process maintaining call history and either queries the process of the information or is autonomously informed of a change in the call history of all devices. In response to the information indicating that the first device 104 had placed a call to the other device (UE8), the peer list engine 300 adds the other device (UE8) to the peer list of the first device. For example, the peer list 306, is revised to include a unique identifier 406 of the other device (UE8).

Figure 5:
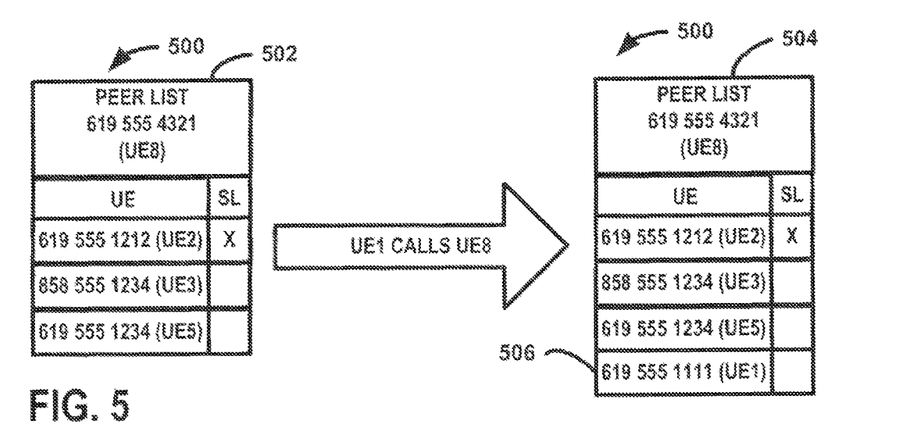
FIG. 5 is an illustration of an example of a change of a peer list due to a call history where the device associated with the peer list receives a call.

FIG. 5 is an illustration of an example of a change of a peer list 500 due to a call history where the device associated with the peer list 500 receives a call. The peer list 500 is shown as a peer list 502 before the call and as peer list 504 after the call. When the first device 104 places a call to the other device (UE8 for the example), the call history is updated. In response to the information indicating that the first device 104 had placed a call to the other device (UE8), the peer list engine 300 adds the first device (UE1) to the peer list 500 of the other device. For example, the peer list 500, is revised to include a unique identifier 506 of the first device (UE1).

Figure 6:
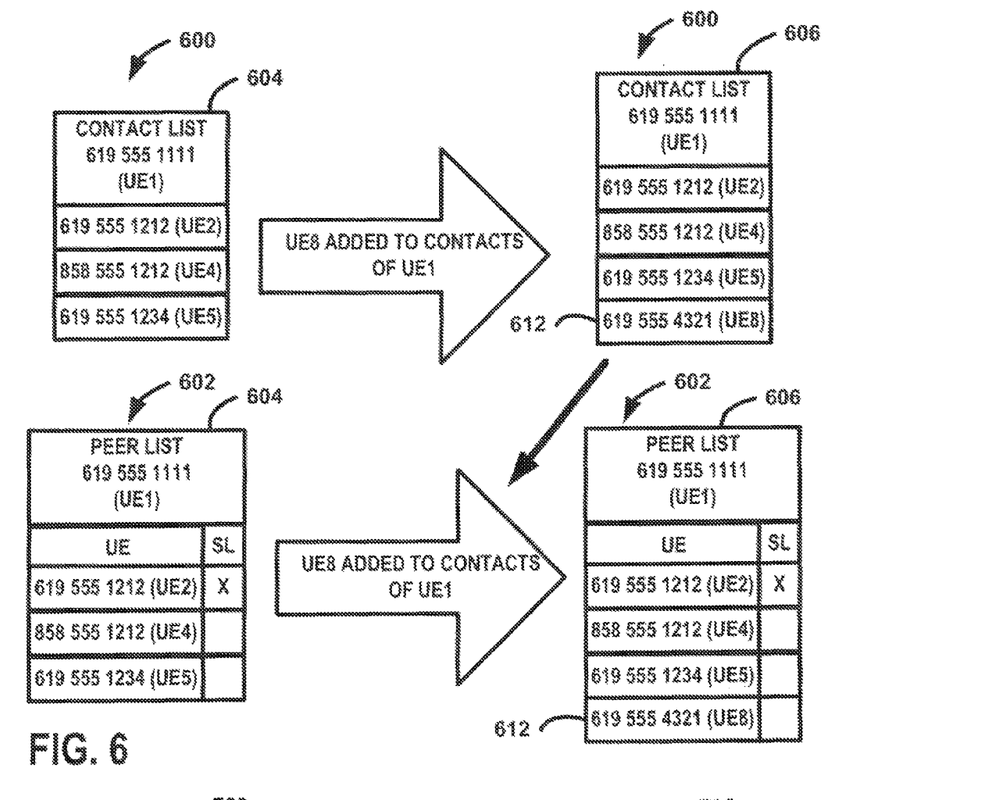
FIG. 6 is an illustration of an example where a change in contact list of a device results in a change to the peer list for the device

FIG. 6 is an illustration of an example where a change in contact list 600 of a device 104 results in a change to the peer list 602 for the device. The contacts list 600 is the contacts list for the device 104 and is shown as a contacts list 604 before the change and as contacts list 606 after the change. The peer list 602 is the peer list for the device 104 and is shown as a peer list 608 before the contact list change and as peer list 610 after the contact list change. A contact list may be locally maintained at the device, on the core network, on a third party server, or on any combination of the three depending on the particular implementation. Typically, the contacts list is changed by the user of the wireless communication device. A change may include adding or deleting a phone number to or from the contacts list. In some situations, additional information may be included for some of the contacts. Information such as, for example, the name, address, or email address may also be included for a contact. The process managing the contacts list is communicatively connected to the peer list engine and may autonomously report contacts lists changes to the peer list engine 300. In some situations, the peer list engine 300 may periodically query the contacts list management process.

Changes to contact lists are provided to the peer list engine 300 to facilitate revisions to the appropriate peer list(s). For example, if a contacts list is updated on a first device to include another device (UE8), the peer list engine 300 is informed of the change. The reported information includes the phone number of the added or deleted contact. For the example in FIG. 6, the contacts list 600 is modified to include the phone number 612 of another device (UE8). The phone number 612 is provided to the peer list engine 300. The peer list engine 300 adds the other device (UE8) as a peer device in the first device peer list 602 by adding the phone number 612 of the other device (UE8) to the peer list of the first device (UE1). The peer list 602, therefore, is revised to include a unique identifier (phone number 612) of the other device (UE8). As discussed with reference to FIG. 7, in some circumstances, the other device peer list is also updated to include the first device as a peer device.

Figure 7:
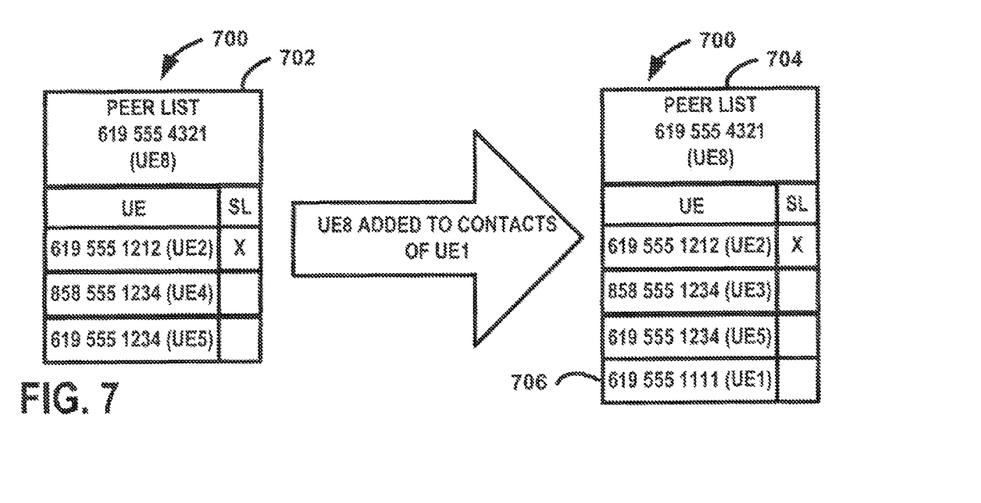
FIG. 7 is an illustration of an example where a change in a contact list of a device results in a change to the peer list for the device (UE8) that was added to the contacts list of the first device.

FIG. 7 is an illustration of an example where a change in a contact list 600 of a device 104 results in a change to the peer list 700 for the device (UE8) that was added to the contacts list of the first device 104. The peer list 700 is the peer list for the device (UE8) and is shown as a peer list 702 before the contact list change and as peer list 704 after the contact list change. As discussed above, changes to contact lists are provided to the peer list engine 300 to facilitate revisions to the appropriate peer list(s). For example, if a contacts list is updated on a first device to include another device (UE8), the peer list engine 300 is informed of the change. For the example in FIG. 7, the peer list engine 300 adds the device 104 as a peer device in the other device peer list 700. For example, the peer list 700 is revised to include a unique identifier 706 identifying the device having a contacts list change.

Figure 8:
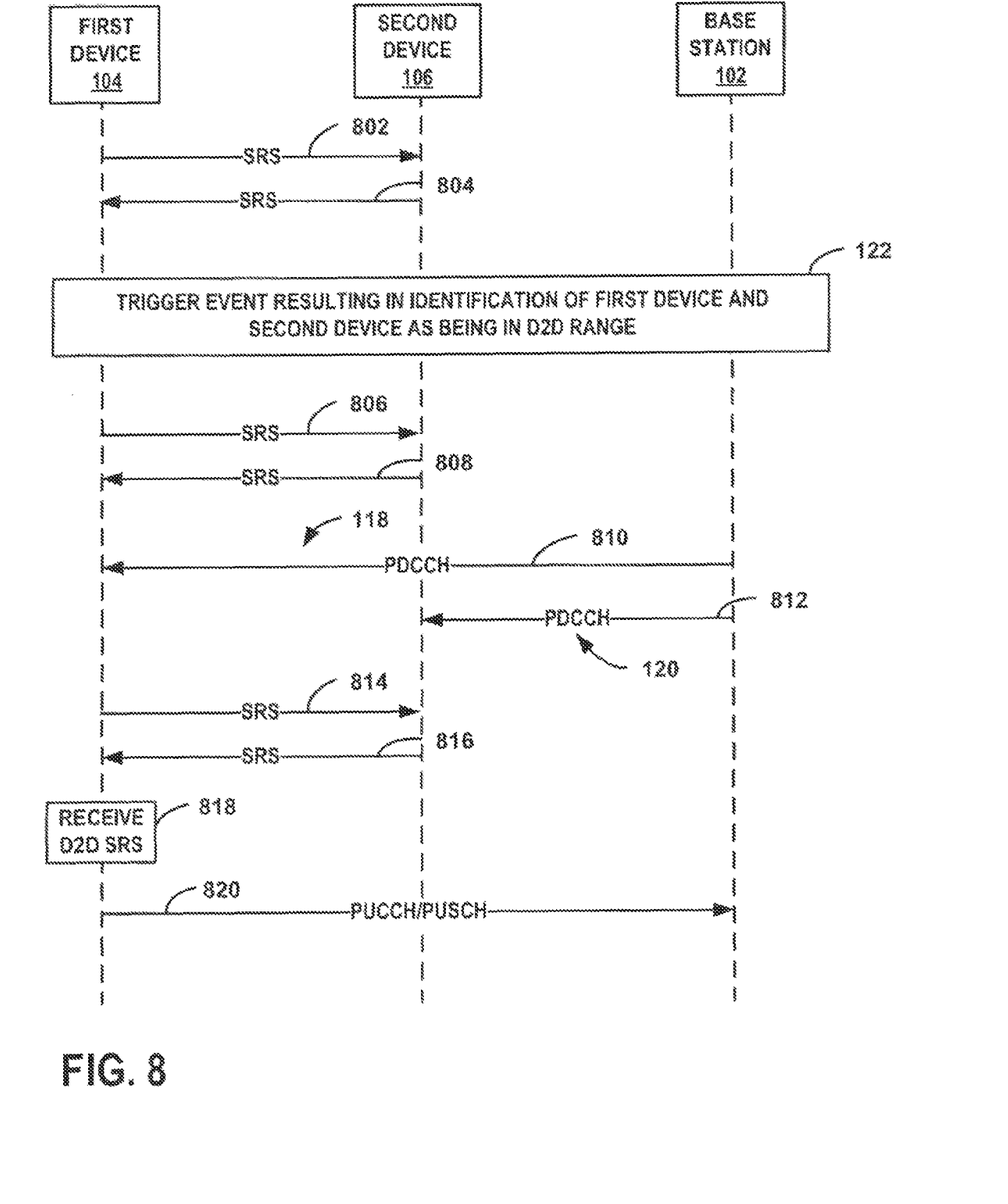
FIG. 8 is a messaging timing for an example of managing D2D communication using peer lists in a system operating in accordance with a 3GPP LTE communication specification.

FIG. 8 is a messaging timing for an example of managing D2D communication using peer lists in a system operating in accordance with a 3GPP LTE communication specification.

In the example, the peer list for the first device 102 lists the unique identifier of the second device and the peer list for the second device includes the unique identifier of the first device. The sequence of events begins with reference signal transmissions 802, 804 by both devices 104, 106. The reference signal transmissions are scheduled by the core network. Control messages are transmitted to the devices indicating which communication resources are to be used for reference signal transmission. The reference signal transmissions are scheduled to such that they are performed periodically. As discussed in the referenced PCT patent application serial number PCT/US2012/64712, SRS is an example of a suitable D2D reference signal. As discussed in the referenced application, the SRS resource information is transmitted from the base station 102 to the first UE device 104 in a PDCCH transmission and SRS resource information is transmitted from the base station 102 to the second UE device 106 in a PDCCH transmission. The D2D SRS communication resources used by each UE device are orthogonal to the D2D SRS communication resources used by other UE devices. Therefore, transmission of SRS on a particular frequency from each UE device is during a time period when no other UE device is transmitting at that same frequency.

At the trigger event 122, the core network determines an event has increased the probability that the two devices can communicate over a D2D link. In most circumstances, the trigger may be a change in geographical position of one or both of the devices which results in a higher quality radio path between the devices. The trigger event 122, however, may be any event that increases the quality of the radio path between the devices. As discussed above, the core network monitors and evaluates the peer lists and detects the trigger event. In some situations, the core network may observe that one of the devices has been handed off to the base station that is serving the other device. As a result, the determination may be made that the two devices may be close enough to each other to communicate directly through a D2D link.

Reference signals are transmitted again at events 806 and 808. As explained above, the reference signals are periodically transmitted. Since the devices 104, 106 are not actively searching for the reference signals, however, the devices 104, 106 are not demodulating or decoding the reference signals 802, 804, 806, 808 at this point.

At event 810, a message 118 is sent from the base station 102 to the first wireless communication device 104, where the message 118 instructs the first wireless communication device to search for reference signals transmitted by the second wireless communication device. The message 118 identifies, either directly or indirectly, the communication resources (time-frequency resources) assigned to the second wireless communication device for transmitting the reference signals. For the example, the message 118 is a search list update message resulting in an update of the search list maintained by the first wireless communication device. Although other techniques may be used, the message 118 is sent using a PDSCH in the example.

At event 812, a message 120 is sent from the base station 102 to the second wireless communication device 106, where the message 120 instructs the second wireless communication device to search for reference signals transmitted by the first wireless communication device. The message 120 identifies, either directly or indirectly, the communication resources (time-frequency resources) assigned to the first wireless communication device for transmitting the reference signals. For the example, the message 120 is a search list update message resulting in an update of the search list maintained by the second wireless communication device. As discussed above, the instruction messages 118, 120 can be instructions to add the peer devices to the D2D search lists of the wireless communication devices. Accordingly, each device 104, 106 has the information necessary to receive the SRS from the other device.

The message is sent over a PDSCH in the example. The message 120 indicates a different time period for searching than the message 118 to the first wireless communication device such that the two device is 104, 106 do not search for each other's reference signals at the same time. In some circumstances, the transmission 812 and the message 120 to the second wireless communication device can be omitted. In other circumstances, in can be sent at different time. For example, the core network may more directly control the searching times by each device by sending a message to a first device to start the search, sending a message to the first device to terminate the search and send a message to the second device to start a search, and so on. For the example of FIG. 8, however, the searching periods are provided in the messages 118, 120 such that each device searches during the identified period.

Reference signals are transmitted again at events 814 and 816. As explained above, the reference signals are periodically transmitted. For the example of FIG. 8, the reference signals are transmitted during the searching period of the first wireless communication device. As a result, the D2D reference signal 816 is received by the first wireless communication device at event 818.

At event 820, the first wireless communication device reports the detection of the D2D reference signal 816 to the base station 102. For the examples, the transmission at event 820 is accomplished using the PUCCH and/or the PUSCH channels. The transmission may include channel information measured using the D2D reference signal in addition to other information. Examples of techniques of reporting channel conditions are discussed in the referenced PCT patent application serial number PCT/US2012/64712.

The devices continue to transmit D2D reference signals on the assigned resources while continuing to monitor the D2D reference signals of the devices within their respective search lists. A D2D communication link can be established when appropriate circumstances arise.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
maintaining in memory, peer relationship information associating a first wireless communication device with a second wireless communication device;
determining a trigger event has occurred, the trigger event increasing a quality of a device-to-device (D2D) radio path between the first wireless communication device and the second wireless communication device; and
sending a message to the first wireless communication device, the message comprising reference signal information describing a reference signal transmitted from the second wireless communication device.

2. The method of claim 1, wherein the reference signal information identifies communication resources used for transmitting the reference signal.

3. The method of claim 1, wherein the peer relationship information is based on a call history comprising at least one call between the first wireless communication device and the second wireless communication device.

4. The method of claim 3, wherein the at least one call comprises a call initiated by the first wireless communication device.

5. The method of claim 3, wherein the at least one call comprises a call initiated by the second wireless communication device.

6. The method of claim 1, wherein the peer relationship is based on a contacts list maintained by the second wireless communication device, the contacts list comprising a phone number of the first wireless communication device.

7. The method of claim 1, wherein the trigger event comprises a decrease in distance between the first wireless communication device and the second wireless communication device.

8. The method of claim 1, wherein the trigger event comprises a change in base station registration of at least one of the first wireless communication devices and the second wireless communication device resulting in both of the devices being registered to the same base station.

9. A wireless communication system comprising:
a core network;
a plurality of base stations connected to the core network and providing macrocell wireless communication service within macrocells, the core network configured to:
maintain in memory, peer relationship information associating a first wireless communication device with a second wireless communication device;
determine a trigger event has occurred, the trigger event increasing a quality of a device-to-device (D2D)

radio path between the first wireless communication device and the second wireless communication device; and send a message to the first wireless communication device through a serving base station of the plurality of base stations, the message comprising reference signal information describing a reference signal transmitted from the second wireless communication device.

10. The system of claim 9, wherein the reference signal information identifies communication resources used for transmitting the reference signal.

11. The system of claim 9, wherein the peer relationship information is based on a call history comprising at least one call between the first wireless communication device and the second wireless communication device.

12. The system of claim 11, wherein the at least one call comprises a call initiated by the first wireless communication device.

13. The system of claim 11, wherein the at least one call comprises a call initiated by the second wireless communication device.

14. The system of claim 9, wherein the peer relationship is based on a contacts list maintained by the first wireless communication device, the contacts list comprising a phone number of the second wireless communication device.

15. The system of claim 9, wherein the peer relationship is based on a contacts list maintained by the second wireless communication device, the contacts list comprising a phone number of the first wireless communication device.

16. The system of claim 9, wherein the trigger event comprises a decrease in distance between the first wireless communication device and the second wireless communication device.

17. The system of claim 9, wherein the trigger event comprises a change in base station registration of at least one of the first wireless communication devices and the second wireless communication device resulting in both of the devices being registered to the same base station.

18. A method comprising:

maintaining in memory, peer relationship information associating a first wireless communication device with a second wireless communication device, wherein the peer relationship is based on a contacts list maintained by the first wireless communication device, the contacts list comprising a phone number of the second wireless communication device;

determining a trigger event has occurred, the trigger event increasing a quality of a device-to-device (D2D) radio path between the first wireless communication device and the second wireless communication device; and sending a message to the first wireless communication device, the message comprising reference signal information describing a reference signal transmitted from the second wireless communication device.

* * * * *